United States Patent Office 3,657,454
Patented Apr. 18, 1972

3,657,454
METHODS OF CONTROLLING SHORT-TAILED MICE
Christa Fest, Wuppertal-Elberfeld, and Gunther Hermann, Leverkusen, Germany, assignors to Farbenfabriken Bayer Aktiengesellschaft, Leverkusen, Germany
No Drawing. Filed Oct. 29, 1969, Ser. No. 872,345
Claims priority, application Germany, Nov. 16, 1968, P 18 09 383.9
Int. Cl. A01n 9/12
U.S. Cl. 424—301
1 Claim

ABSTRACT OF THE DISCLOSURE

Methods of selectively combating and controlling short-tailed mice using certain (1-fluoroacetylamino-2,2,2-trichloro-eth-1-yl)-(alkoxythiocarbonyl, benzoyl and alkylphenyl)-thioethers, i.e. 1 - (alkoxythiocarbonylmercapto, benzoylmercapto and alkylphenylmercapto) - 1 - fluoroacetylamino - 2,2,2 - trichloro-ethanes, which are known, which possess selective rodenticidal properties, and which may be produced by conventional methods.

The present invention relates to and has for its objects the provision for particular new methods of selectively combating and controlling short-tailed mice using certain (1 - fluoroacetylamino - 2,2,2-trichloro-eth-1-yl)-(alkoxythiocarbonyl, benzoyl and alkylphenyl)-thioethers, i.e. 1- (alkoxythiocarbonylmercapto, benzoylmercapto and alkylphenylmercapto) - 1 - fluoroacetylamino-2,2,2-trichloro-ethanes, which are known and which possess valuable selective rodenticidal properties, alone or in the form of mixtures of such compounds with solid and liquid dispersible carrier vehicles, with other and further objects becoming apparent from a study of the within specification and accompanying examples.

It is known that the instant 1-fluoroacetylamino-2,2,2-trichloro-ethane thioethers, i.e. fluoroacetylamino-trichloromethyl-methane derivatives, can be used as insecticidal and acaricidal agents (cf. British Pat. 1,117,571). Their use as rodenticides, however, has not been suggested.

It is known in this regard to use, for the control of short-tailed mice, rodenticides such as sodium monofluoroacetate (A), monofluoroacetamide (B), 1,2,3,4,10,10-hexachloroexo - 6,7 - epoxy-1,4,4a,5,6,7,8,8a-octahydro-1,4,5,8 - endo,endo - dimethane-naphthalene (C), chlorinated camphene (D), and 2-chloro-4-methyl-6-dimethylamino-pyrimidine (E). All these substances are about equally toxic to all warm-blooded animals, for example to useful kinds of birds, and therefore when used against short-tailed mice they represent a serious danger to the wild-life community.

It is furthermore known that fluoroacetylated animals such as 1 - dimethylamino - 1-fluoroacetylamino-2,2,2-trichloroethane (F), and 1-methylamino - 1 - fluoroacetylamino-2,2,2-trichloro-ethane (G), can be used for the control of Microtinae (cf. German Pat. 1,218,460). These substances, too, are relatively toxic to birds.

It has now been found, in accordance with the present invention, that certain 1-fluoroacetylamino-2,2,2-trichloroethane thioethers, which are known, of the formula

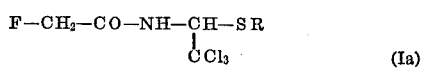

in which
R is alkoxythiocarbonyl having 1–4 carbon atoms in the alkoxy moiety, benzoyl or alkylphenyl having 1–4 carbon atoms in the alkyl moiety, alone or in admixture with a solid or liquid diluent or carrier, exhibit strong, especially selective, rodenticidal properties with respect to short-tailed mice.

It is very surprising that the active compounds of Formula Ia above according to the present invention exhibit a higher specificity with regard to their toxicity to warm-blooded animals than the fluoroacetylated animals previously known to possess rodenticidal activity. Therefore, the use of the instant compounds according to the present invention represents a valuable contribution to the art.

The known compounds of Formula Ia above are obtained in simple manner when a 1-chloro-1-fluoroacetylamino-2,2,2-trichloro-ethane of the formula:

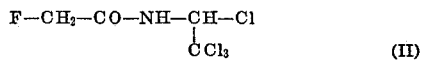

is reacted with a thio compound of the formula:

$$MSR \qquad (III)$$

in which

R is the same as defined above, and
M is hydrogen or an alkali metal, such as sodium, potassium, and the like.

The active compounds usable according to the present invention are clearly characterized by the Formula Ia above.

Advantageously, in accordance with the present invention, in the various formulae herein:
R represents
Alkoxythiocarbonyl having 1–4 carbon atoms in the alkoxy moiety such as methoxy, ethoxy, n- and isopropoxy, n-, iso-, sec.- and tert.-butoxy, and the like, -thiocarbonyl, especially $C_{1-3}$ or $C_{1-2}$ alkoxythiocarbonyl

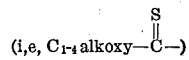

Benzoyl; or
Alkylphenyl having 1–4 carbon atoms in the alkyl moiety, such as 2-, 3- and 4-methyl, ethyl, n- and isopropyl, n-, iso-, sec.- and tert.-butyl, and the like, -phenyl, especially $C_{1-3}$ or $C_{1-2}$ alkyl-phenyl, and more especially 4-($C_{1-3}$ or $C_{1-2}$ alkyl)-phenyl.
Preferably, R is $C_{1-3}$ alkoxy-thiocarbonyl; or benzoyl; or $C_{1-3}$ alkyl-phenyl.
In particular, R is $C_{1-2}$ alkoxy-thiocarbonyl; or benzoyl; or 4-($C_{1-2}$ alkyl)-phenyl.

Examples of typical 1-fluoroacetylamino-2,2,2-trichloroethane thioethers usable according to the present invention are:

1-(4'-methyl-phenylmercapto) - 1 - fluoroacetylamino-2,2,2-trichloro ethane:

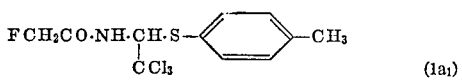

(1a₁)

1-ethoxythiocarbonylmercapto - 1 - fluoroacetylamino-2,2,2-trichloro-ethane:

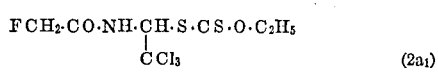

(2a₁)

1-benzoylmercapto - 1 - fluoroacetylamino-2,2,2-trichloro-ethane:

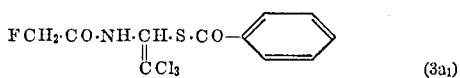

(3a₁)

The reaction for producing the instant compounds can be carried out in the optional presence of an inert solvent (this term includes a mere diluent). Suitable for this purpose are for example hydrocarbons, such as benzine and benzene; chlorinated hydrocarbons, such as methylene chloride; ethers, such as dioxan; ketones, such as acetone; alcohols, such as methanol; and more highly polar solvents, such as acetonitrile; and the like.

If the starting thio compound of Formula III above is used in free form, it is expedient to use an acid binder in order to bind the hydrochloric acid which is formed. Suitable for this purpose are, in particular, acid binding agents such as tertiary amines, including pyridine, triethylamine, trimethylamine, and the like.

The reaction temperature can be varied within a certain range; in general, the work is carried out at from substantially between about −20° C. to +60° C., and preferably between about 15 to 50° C.

Advantageously, the active compounds of Formula Ia above according to the present invention exhibit selective rodenticidal properties and are therefore well suited for the control of destructive short-tailed mice (Microtinae).

These short-tailed mice include for example the common vole (*Microtus arvalis*), the field vole (*Microtus agrestis*), the water vole (*Arvicola terrestris*), the musk rat (*Ondatra zibethica*), and the like.

Surprisingly, the instant active compounds are only slightly toxic to other warm-blooded creatures, such as useful birds and domestic animals. This is also true even in the case of rodents outside the group of the short-tailed mice.

The active compounds according to the instant invention can be utilized, if desired, in the form of the usual formulations or compositions with conventional, preferably inert, pesticidal diluents or extenders, i.e. diluents or extenders of the type usable in conventional pesticidal formulations or compositions, e.g. conventional pesticidal dispersible carrier vehicles, such as solutions, emulsions, suspensions, emulsifiable concentrates, pastes, soluble powders, dusting agents, granules, etc. These are prepared in known manner, for instance by extending the active compounds with conventional pesticidal dispersible liquid diluent carriers and/or dispersible solid carriers, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.).

Such active compounds may be employed alone or in the form of mixtures with one another and/or with such solid and/or liquid dispersible carrier vehicles and/or with other known compatible active agents, especially plant protection agents, such as other rodenticides, or herbicides, fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.01–30%, preferably 0.05–20%, by weight of the mixture. Thus, the present invention contemplates over-all compositions which comprise mixtures of a conventional dispersible carrier vehicle such as (1) a dispersible inert finely divided carrier solid, or (2) a dispersible carrier liquid such as an inert organic solvent and/or water, and an amount of the active compound which is effective for the purpose in question and which is generally between about 0.01–95%, and preferably 0.05–95%, by weight of the mixture.

In particular, the active compounds according to the present invention are incorporated in carrier vehicles which are in the form of the usual bait material of animal and vegetable origin, for example cereal grains, cereal ground products, meat meal, fish meal, and the like; or in food-free play baits of paper, synthetic materials, rubber, and the like; or in drinking water; i.e. a food material for short-tailed mice or a substance which stimulates their play instinct.

Of course, the active compounds according to the present invention may be present in such bait formulations in admixture with other active compounds, if desired, as the artisan will appreciate.

Accordingly, the bait formulations contain, in general, from about 0.01–30% by weight of active compound, and preferably 0.05–20% by weight of active compound, as aforesaid.

In particular, the present invention contemplates methods of selectively killing, combating or controlling rodents, and especially short-tailed mice, which comprise applying to at least one of (a) such short-tailed mice and (b) their habitat, i.e. the locus to be protected, a rodenticidally effective or toxic amount of the particular active compound of the invention together with a carrier vehicle, e.g. bait, as noted above. The instant formulations or compositions are applied in the usual manner, for instance by scattering and particularly by strategically depositing the same incorporated in a bait.

It will be realized, of course, that the concentration of the particular active compound utilized, alone or in admixture with the carrier vehicle, e.g. a bait, may vary within a fairly wide range and will depend upon the intended application as the artisan will appreciate. Therefore, in special cases, it is possible to go above or below the aforementioned concentration ranges.

The outstanding selective rodenticidal effectiveness of the particular active compounds usable according to the present invention, as well as their distinct superiority compared with known products of the same type of activity of analogous constitution, can be seen, by way of illustration and without limitation, from the following example.

EXAMPLE 1

Toxicity test/peroral

| Test animal: | Evaluation after (days) |
|---|---|
| Common vole (*Microtus arvalis*) | 3 |
| Albino rat (*Rattus norvegicus*) | 7 |
| Albino mouse (*Mus musculus*) | 3 |
| Canary (*Serinus canarius*) | 7 |
| Pigeon (*Columba livia*) | 7 | provided with indices are taken from the literature. The indices denote:

(1) Hüter, F. Anz. Schädlingskde, XXV, pp. 137–140 (1952).
(2) Hüter, F., Anz. Schädlingskde, XXIV, pp. 23–26 (1951).
(3) Spector, W. S., Handbook of Toxicology, vol. I, W. B. Saunders Comp., Philadelphia and London (1956).
(4) Brooks, J. E., International Pest Control 5, No. 6, pp. 21–22 (1963).
(5) Buckle, F. J., Heap, R. and Saunders, B. C., J. Chem. Soc., p. 912 (1949).
(6) Steiner, P. and Gruch, W., Mitt. Biol. Bundesanst. f. Land- u. Forstwirtsch., No. 95 (1959).
(7) Gruch, W. and Steiner, P., Mitt. Biol. Bundesanst. für Land- und Forstwirtsch., No. 102 (1960).
(8) DuBois, K. P.; Cochran, K. W. and Thomson, J. F., Proc. Soc. exper. Biol. a. med. 67, pp. 169–171 (1948).
(9) Gylstorff, J. Bayer. Landwirtsch. Jahrbuch 39, No. 1, pp. 19–32 (1962).

TABLE 1.—TOXICITY TEST/PERORAL

| Active compound | LD$_{50}$ values in mg./kg. of body weight | | | |
|---|---|---|---|---|
| | Albino rat | Albino mouse | Common vole | C=Canary P=Pigeon |
| Known active compounds: | | | | |
| (A) Sodium monofluroacetate | 5–7(1) | 8–10(2) | 5 | P 2.5–9(3) |
| (B) Monofluoroacetamide | 15(4) | 6–10(5) | 15 | |
| (C) 1,2,3,4,10,10-hexachloroexo-6,7-epoxy-1,4,4a,5,6,7,8,8a-octahydro-1,4,5,8-endo, endo-dimethane-naphthalene. | 7.3(6) | 8 | 8 | |
| (D) Chlorinated camphene | 90–125(7) | 112(7) | 90(7) | P 200–250(7) |
| (E) 2-chloro-4-methyl-6-dimethylamino-pyrimidine | 1–2(8) | 1–2(8) | 2 | P ca. 4(9) |
| (F) FCH$_2$·CO·NH·CH·N—(CH$_3$)$_2$ $\quad\quad\quad$ \| $\quad\quad\quad$ CCl$_3$ (Federal German Patent 1,218,460) | 50 | 450 | 3.75 | C <25 |
| (G) FCH$_2$·CO·NH·CH·NH·CH$_3$ $\quad\quad\quad$ \| $\quad\quad\quad$ CCl$_3$ Federal German Patent (1,218,460) | 56 | 150 | 5 | C 6 |
| Active compounds according to the invention: | | | | |
| (1a$_2$) FCH$_2$CO·NH·CH·S—⟨C$_6$H$_4$⟩—CH$_3$ $\quad\quad\quad$ \| $\quad\quad\quad$ CCl$_3$ | 65 | >150 | 7.1 | C >25 |
| (2a$_2$) FCH$_2$·CO·NH·CH·S·CS·O·C$_2$H$_5$ $\quad\quad\quad$ \| $\quad\quad\quad$ CCl$_3$ | 157 | >150 | 10 | C 113 P 160 |
| (3a$_2$) FCH$_2$·CO·NH·CH·S·CO—⟨C$_6$H$_5$⟩ $\quad\quad\quad$ \| $\quad\quad\quad$ CCl$_3$ | 212 | 425 | 5 | C >80 P >500 |

To produce a suitable preparation of the particular active compound, 3 parts by weight of such active compound are mixed with 2.8 parts by weight of highly dispersed silicic acid and 4.2 parts by weight of talc. From this concentrate of the active compound there are produced by trituration with water, with the addition of a little powdered plant gum, suspensions which contain in 1 ml. of liquid the amount of active compound to be applied per 100 g. of animal weight. Dosage is effected volumetrically after weighing of the test animals. Application is per os by means of a steel probe with a bulbous end or a plastic catheter. Evaluation takes place in each case after expiration of the period of time stated above, calculated from the application of the given active compound.

The determination of the LD$_{50}$ values (dose of active compound at which 50% of the treated animals are killed) is effected from the mortality values of the doses varied in geometrical progression in customary manner.

The particular active compounds, LD$_{50}$ values and test animals can be seen from the following table. The values It will be realized by the artisan that all of the foregoing compounds contemplated by the present invention possess the desired strong and selective rodenticidal properties, i.e. for controlling and destroying selectively short-tailed mice, as well as a comparatively low toxicity toward other warm-blooded creatures, enabling such compounds to be used with correspondingly favorable compatibility with respect to such other warm-blooded creatures for more effective control and/or elimination of short-tailed mice by application of such compounds to such short-tailed mice and/or their habitat.

It will be appreciated that the instant specification and examples are set forth by way of illustration and not limitation, and that various modifications and changes may be made without departing from the spirit and scope of the present invention.

What is claimed is:

1. Method of controlling short-tailed mice which comprises administering to said mice a rodenticidally effective amount of 1-benzoylmercapto-1-fluoroacetylamino-2,2,2-trichloroethane of the formula
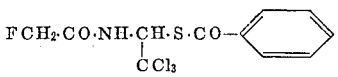
References Cited
FOREIGN PATENTS
1,117,571  6/1968  Great Britain. _____ 424—301
JEROME D. GOLDBERG, Primary Examiner
U.S. Cl. X.R.
424—324